(12) United States Patent
Tsuruda

(10) Patent No.: US 9,531,196 B2
(45) Date of Patent: Dec. 27, 2016

(54) WIRELESS POWER TRANSMISSION SYSTEM AND METHOD FOR DESIGNING THE SAME

(71) Applicant: DAIHEN Corporation, Osaka-shi, Osaka (JP)

(72) Inventor: Yoshinori Tsuruda, Osaka (JP)

(73) Assignee: DAIHEN Corporation, Osaka (JP)

( * ) Notice: Subject to any disclaimer, the term of this patent is extended or adjusted under 35 U.S.C. 154(b) by 463 days.

(21) Appl. No.: 14/293,177

(22) Filed: Jun. 2, 2014

(65) Prior Publication Data

US 2014/0354067 A1  Dec. 4, 2014

(30) Foreign Application Priority Data

Jun. 4, 2013 (JP) ................................. 2013-117652

(51) Int. Cl.
*H02J 5/00* (2016.01)

(52) U.S. Cl.
CPC ..................................... *H02J 5/005* (2013.01)

(58) Field of Classification Search
None
See application file for complete search history.

(56) References Cited

U.S. PATENT DOCUMENTS

| 2011/0254378 | A1 | 10/2011 | Ichikawa et al. | |
|---|---|---|---|---|
| 2015/0207331 | A1* | 7/2015 | Petersen | H02J 17/00 307/104 |
| 2016/0190819 | A1* | 6/2016 | Petersen | H02J 5/005 307/104 |

FOREIGN PATENT DOCUMENTS

| JP | 8-264357 | 10/1996 |
|---|---|---|
| JP | 4962621 | 4/2012 |

* cited by examiner

*Primary Examiner* — Jared Fureman
*Assistant Examiner* — Aqeel Bukhari
(74) *Attorney, Agent, or Firm* — Hamre, Schumann, Mueller & Larson, P.C.

(57) ABSTRACT

A wireless power transmission system includes a transmitting antenna, a power supply for supplying power of a resonance frequency $f_0$ to the transmitting antenna, a first capacitor connected in series to the transmitting antenna, a receiving antenna magnetically coupled to the transmitting antenna, a load connected to the receiving antenna, and a second capacitor connected in series to the receiving antenna. Supposing that the coupling factor between the transmitting antenna and the receiving antenna is represented by k, the internal resistance of the power supply by Rs and the resistance of the load by $R_L$, then the self-inductance $L_S$ of the transmitting antenna and the self-inductance $L_L$ of the receiving antenna are determined to satisfy an equation: $L_S \times L_L = R_S \times R_L/(2\pi f_0 k)^2$. Further, the capacitance $C_S$ of the first capacitor and the capacitance $C_L$ of the second capacitor are determined to satisfy equations: $C_S = 1/(2\pi f_0)^2 L_S$ and $C_L = 1/(2\pi f_0)^2 L_L$.

5 Claims, 8 Drawing Sheets

WIRELESS POWER TRANSMISSION SYSTEM AND METHOD FOR DESIGNING THE SAME

BACKGROUND OF THE INVENTION

1. Field of the Invention

The present invention relates to a wireless power transmission system. The invention also relates to a method for designing such a system. In particular, the present invention relates to a method for designing the mutually cooperating antennas in the system by finding the optimum inductances of them based on the coupling factor.

2. Description of the Related Art

A technique called "wireless power transmission" or "wireless energy transfer" is known. With this technique, it is possible to transfer electric power from a power supply to a load in a wireless manner, i.e., without using tangible conductors such as metal wires.

The technique has been applied to power supply in cell phones, home electrical appliances or electric cars. For instance, Japanese Patent No. 4962621 discloses an application of wireless power transmission using magnetic resonance for charging the storage battery of an electric car. As another example, JP-A-8-264357 discloses a monorail-type transfer system in which a power supply line is arranged along a rail, and electric power is transmitted wirelessly from the rail to a transfer vehicle.

In designing a conventional wireless power transmission system, the geometric features (such as sizes and disposition) of a power transmitting and a power receiving antennas are generally determined in view of e.g., the usage of the system, the environment in which the system is used, and the frequency used for the power transmission. On the other hand, electrical factors such as inductance of the antennas have not been duly considered in realizing efficient power transmission.

SUMMARY OF THE INVENTION

The present invention has been proposed under the circumstances described above. It is therefore an object of the present invention to provide a wireless power transmission system including properly designed antennas cooperating with each their for power transmission. Another object of the present invention is to provide a method for designing such a wireless power transmission system (in particular the antennas used in the system), whereby a high power transmission efficiency is achievable by adjusting the self-inductances of the respective antennas based on the coupling factor between the antennas.

According to a first aspect of the present invention, there is provided a wireless power transmission system that includes: a transmitting antenna; a power supply for supplying electric power of a resonance frequency $f_0$ to the transmitting antenna; a first capacitor connected in series to the transmitting antenna; a receiving antenna magnetically coupled to the transmitting antenna; a load connected to the receiving antenna; and a second capacitor connected in series to the receiving antenna. Supposing that the coupling factor between the transmitting antenna and the receiving antenna is represented by k, the internal resistance of the power supply is represented by Rs and the resistance of the load is represented by $R_L$, the self-inductance $L_S$ of the transmitting antenna and the self-inductance $L_L$ of the receiving antenna are configured to satisfy equation (1) below.

$$L_S \times L_L = \frac{R_S \times R_L}{(2\pi f_0 k)^2} \tag{1}$$

In addition, the capacitance $C_S$ of the first capacitor and the capacitance $C_L$ of the second capacitor are configured to satisfy equations (2), (3) below.

$$C_S = \frac{1}{(2\pi f_0)^2 L_S} \tag{2}$$

$$C_L = \frac{1}{(2\pi f_0)^2 L_L} \tag{3}$$

In an embodiment of the present invention, the self-inductance $L_S$ of the transmitting antenna and the self-inductance $L_L$ of the receiving antenna are equal to each other. In this case, each of the inductances $L_S$ and $L_L$ is equal to $$\frac{\sqrt{R_S \times R_L}}{2\pi f_0 k},$$

as obtained from equation (1) above.

In an embodiment of the present invention, the transmitting antenna is made up of two electroconductive line elements parallel to each other.

According to a second aspect of the present invention, there is provided a method for designing a wireless power transmission system, where the system includes a transmitting antenna, a power supply for supplying electric power of a resonance frequency $f_0$ to the transmitting antenna, a first capacitor connected in series to the transmitting antenna, a receiving antenna magnetically coupled to the transmitting antenna, a load connected to the receiving antenna, and a second capacitor connected in series to the receiving antenna. Supposing that the coupling factor between the transmitting antenna and the receiving antenna is represented by k, the internal resistance of the power supply is represented by $R_S$ and the resistance of the load is represented by $R_L$, the method of the second aspect includes:

a first step of setting a self-inductance $L_S$ of the transmitting antenna and a self-inductance $L_L$ of the receiving antenna so as to satisfy equation (4) below:

$$L_S \times L_L = \frac{R_S \times R_L}{(2\pi f_0 k)^2}, \tag{4}$$

and a second step of setting a capacitance $C_S$ of the first capacitor and a capacitance $C_L$ of the second capacitor so as to satisfy equations (5) and (6) below:

$$C_S = \frac{1}{(2\pi f_0)^2 L_S} \tag{5}$$

$$C_L = \frac{1}{(2\pi f_0)^2 L_L}. \tag{6}$$

According to the embodiments of the present invention, the properly designed antennas assure efficient power transmission from the power supply to the load.

Other features and advantages of the present invention will become more apparent from detailed description given below with reference to the accompanying drawings.

DETAILED DESCRIPTION OF THE PREFERRED EMBODIMENTS

Preferred embodiments of the present invention will be described below with reference to the accompanying drawings.

Figure 1:
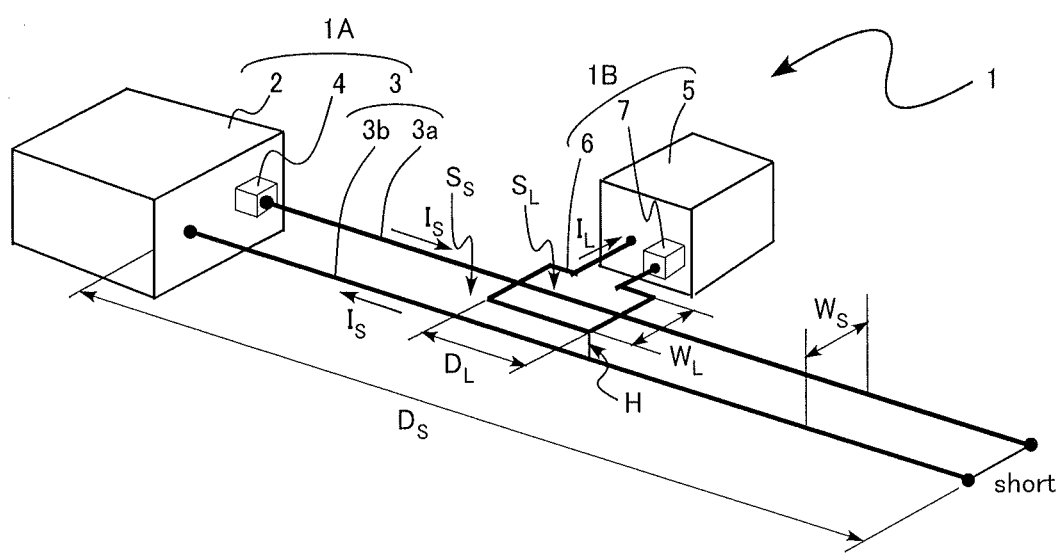
FIG. 1 is a schematic view illustrating a wireless power transmission system according to a first embodiment of the present invention.

FIG. 1 illustrates the overall structure of a wireless power transmission system according to a first embodiment of the present invention.

As shown in FIG. 1, the wireless power transmission system 1 includes a high-frequency power supply 2 for generating high-frequency electric power, a parallel transmission line 3 to which the high-frequency power is outputted from the high-frequency power supply 2, a capacitor 4 connected in series to the parallel transmission line 3, a coil 6 magnetically coupled to the parallel transmission line 3, a capacitor 7 connected in series to the coil 6, and a load 5 connected to the coil 6. In the illustrated embodiment, the high-frequency power supply 2, the parallel transmission line 3 and the capacitor 4 constitute a power transmitter 1A, while the load 5, the coil 6 and the capacitor 7 constitute a power receiver 1B.

The high-frequency power supply 2 generates high-frequency power that is to be transmitted to the load 5. The high-frequency power supply 2 includes an AC/DC converter, an inverter and a filter. In the high-frequency power supply 2, the alternative voltage from a commercial power supply is converted by the AC/DC converter into a direct voltage, and the direct voltage is converted into a predetermined high-frequency voltage by the inverter and the filter. The obtained high-frequency voltage is then outputted to the parallel transmission line 3.

The parallel transmission line 3, functioning as a distributed constant conductor, is made up of two electroconductive line elements 3a and 3b (such as wires, rods, etc.) arranged parallel to each other. The two elements 3a, 3b are arranged in a manner such that that the line plane Ss containing the two elements 3a, 3b is parallel to the surface of the ground where the system 1 is disposed. The parallel transmission line 3 functions as a power transmitting antenna that transmits the power from the high-frequency power supply 2 to the power receiver 1B. In the illustrated embodiment, the distal ends of the line elements 3a, 3b are shorted-circuited. Alternatively, these ends may be opened or connected to a certain impedance.

The capacitor 4 is connected to one line element 3a of the parallel transmission line 3, thereby constituting a series resonant circuit.

The load 5 consumes the high-frequency power supplied from the high-frequency power supply 2.

The coil 6 has one or more windings and has a rectangular coil surface $S_L$ having a width $W_L$ equal (or generally equal) to the distance Ws between the conductive elements 3a, 3b and a length $D_L$ which is sufficiently smaller than the length $D_S$ of the parallel transmission line 3. The coil 6 functions as a power receiving antenna that receives the power transmitted through the parallel transmission line 3. The coil 6 is arranged in a manner such that the coil surface $S_L$ is parallel to the line plane Ss and disposed at a predetermined height H from the line plane Ss, and that the center of the coil surface $S_L$ (in the width direction) corresponds or generally corresponds to the center of the line plane Ss (in the width direction). Although the coil surface $S_L$ of the coil 6 is rectangular in the embodiment, the present invention is not limited to this. For instance, the coil 6 may have a circular or oval coil surface.

In the above embodiment, the line plane Ss is parallel to the ground surface, though the present invention is not limited to this. The line plane Ss may be perpendicular to the ground surface or inclined at any other angle. In these cases again, the coil 6 is arranged so that the coil surface $S_L$ is parallel to the line plane Ss.

The capacitor 7 is connected in series to the coil 6, thereby constituting a series resonant circuit.

Referring now to FIGS. 2-7, a method for designing the above-noted transmission system is described.

Figure 2:
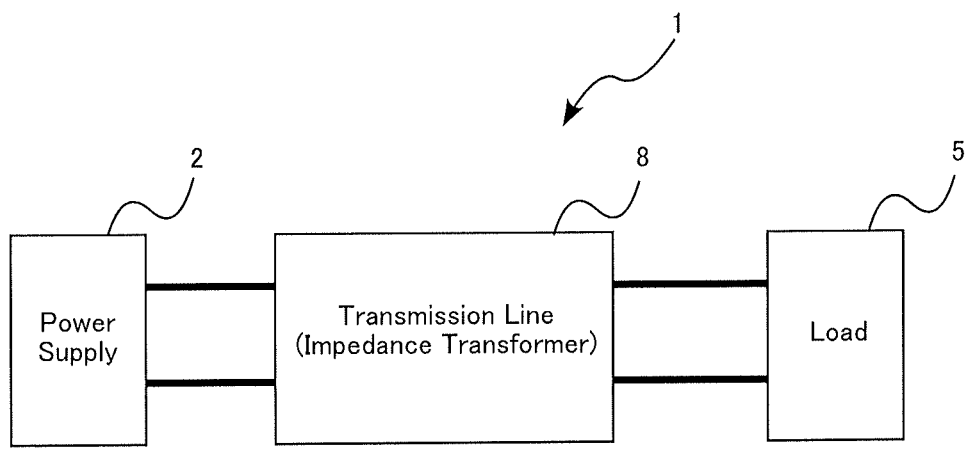
FIG. 2 is a view showing that the transmission line of a wireless power transmission system functions as an impedance transformation circuit.
Figure 3:
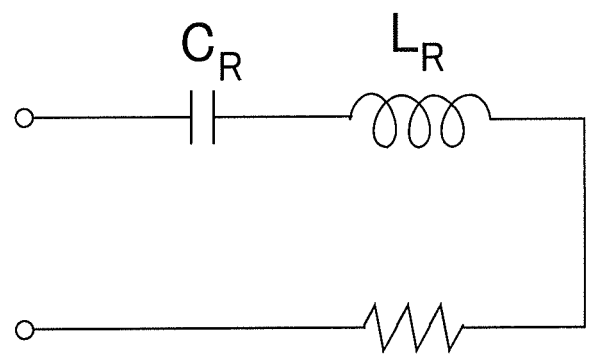
FIG. 3 is a circuit diagram for explaining the series resonance.

Generally, in a high-frequency circuit, impedance matching needs to be performed for efficient power transmission between the signal source and the load. According to the embodiment of the present invention, as shown in FIG. 2, impedance matching is to be performed by the transmission line 8 itself (i.e., without using an additional impedance matching device). Specifically, the transmission lien 8 serves as an impedance conversion circuit that matches the output impedance of the power supply 2 and the input impedance of the load 5, thereby providing optimum power transmission characteristics. In the illustrated embodiment, the transmission line 8 is a combination of the parallel transmission line 3 (line elements 3a, 3b), the coil 6, the capacitor 4 (connected to the line 3) and the capacitor 7 (connected to the coil 6).

In wireless power transmission using magnetic resonance, an antenna used for power transmission is to be resonated at a prescribed frequency ("resonance frequency $f_0$"). To this end, the self-inductance $L_R$ of the antenna and the capacitance $C_R$ of a capacitor ("resonant capacitor") connected in series to the antenna are set to satisfy the following equation (E1). By this, the imaginary part of the impedance measured at the terminals of the circuit shown in FIG. 3 becomes zero at the frequency $f_0$.

$$2\pi f_0 L_R = \frac{1}{2\pi f_0 C_R} \tag{E1}$$

Figure 4A:
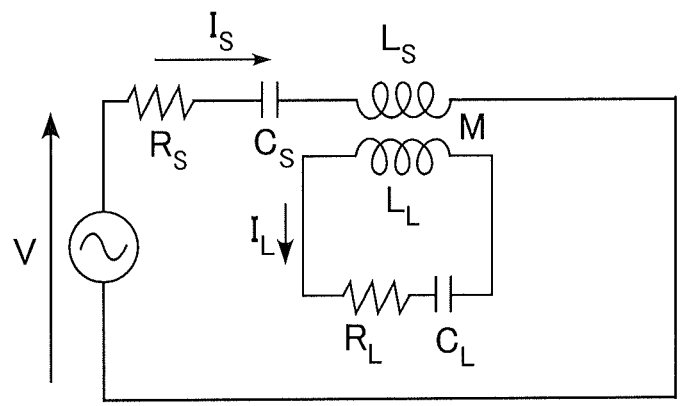
FIGS. 4A-4C illustrate equivalent circuits of the wireless power transmission system according to the first embodiment of the present invention.

FIG. 4A shows an equivalent circuit of the wireless power transmission system 1 shown in FIG. 1. In the circuit shown in FIG. 4A, $R_S$ represents the internal resistance of the high-frequency power supply 2, $C_S$ represents the capacitance of the capacitor 4, $L_S$ represents the self-inductance of the parallel transmission line 3, $R_L$ represents the resistance of the load 5, $C_L$ represents the capacitance of the capacitor 7 and $L_L$ represents the self-inductance of the coil 6. The mutual inductance by the magnetic coupling of the parallel transmission line 3 and the coil 6 is expressed as M. The conductor loss of the parallel transmission line 3 and the coil 6 is ignored.

Figure 4B:
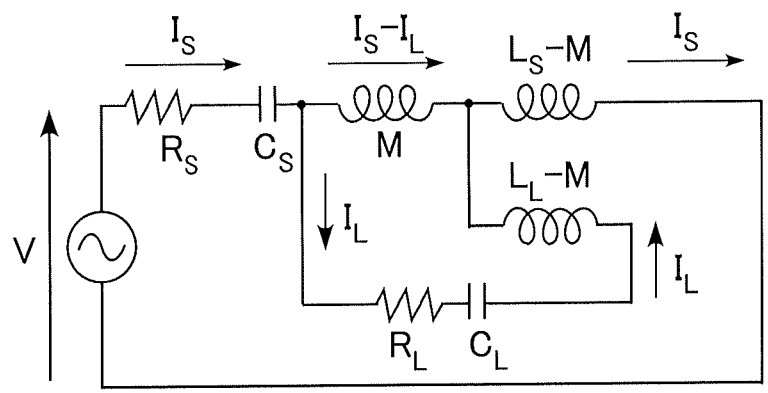
Figure 4C:
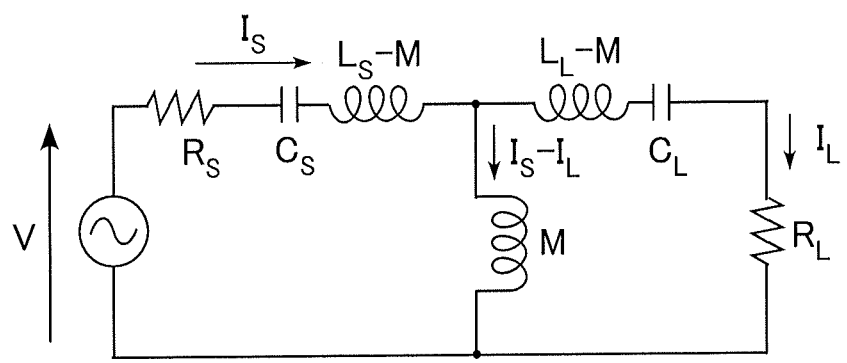

The circuit shown in FIG. 4A can be converted into the equivalent circuit shown in FIG. 4C by way of the equivalent circuit shown in FIG. 4B.

Specifically, the voltage V of the high-frequency power supply 2 is expressed by the equation (E2) below. The equation (E3) also holds.

$$V = R_S I_S + \frac{1}{j\omega C_S} I_S + j\omega L_S I_S - j\omega M I_L \quad (E2)$$

$$R_L I_L + \frac{1}{j\omega C_L} I_L + j\omega L_L I_L - j\omega M I_S = 0 \quad (E3)$$

From the equations (E2) and (E3), the following equations (E4) and (E5) are obtained, respectively. These equations (E4), (E5) lead to the circuit shown in FIG. 4B.

$$V = R_S I_S + \frac{1}{j\omega C_S} I_S + j\omega(L_S - M) I_S - j\omega M(I_L - I_S) \quad (E4)$$

$$R_L I_L + \frac{1}{j\omega C_L} I_L + j\omega(L_L - M) I_L - j\omega M(I_S - I_L) = 0 \quad (E5)$$

Finally, by arranging the wiring of the circuit shown in FIG. 4B, the circuit shown in FIG. 4C is obtained.

Figure 5:
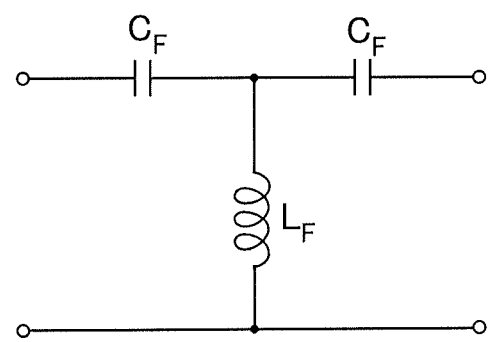
FIG. 5 illustrates a T-type high-pass filter circuit.

FIG. 5 shows a circuit of T-type high-pass filter known in the high frequency applications. At the resonance frequency $f_0$ that satisfies the equation (E6) below, this circuit shows the same characteristics as those of a quarter wavelength transmission line having a characteristic impedance $Z_F$.

$$2\pi f_0 L_F = \frac{1}{2\pi f_0 C_F} = Z_F \quad (E6)$$

Figure 6:
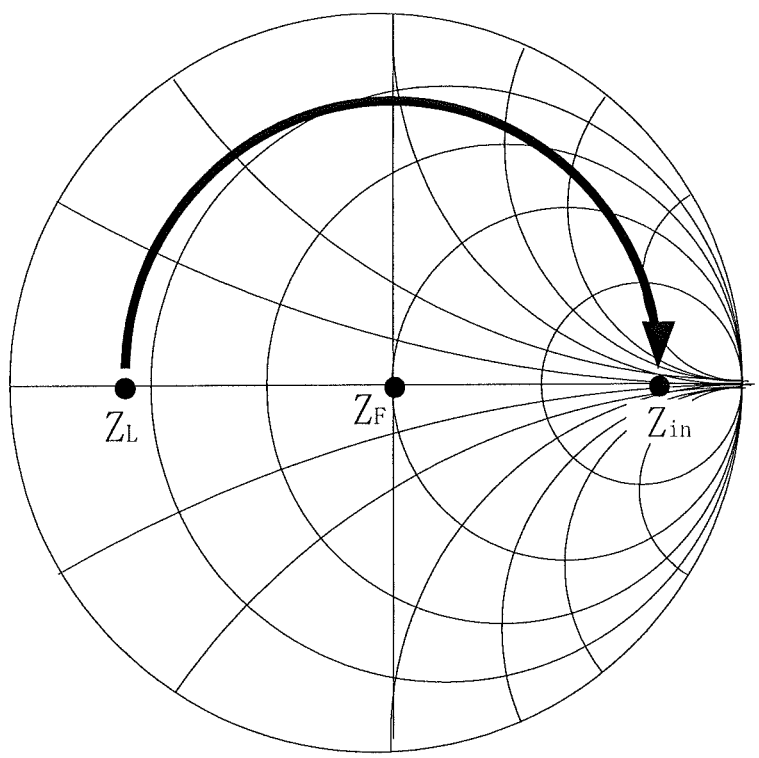
FIG. 6 illustrates an impedance transformation plotted on a Smith chart.

FIG. 6 shows impedance transformation by the quarter wavelength transmission line plotted on the Smith chart normalized to the characteristic impedance $Z_F$ of the transmission line. As depicted in the figure, the impedance transformation corresponds to the clockwise rotation through 180 degrees around the characteristic impedance $Z_F$. When a load with an impedance $Z_L$ is connected to the circuit shown in FIG. 5, the impedance $Z_{in}$ seen from the input side assumes a value that satisfies the equation (E7) below.

$$Z_{in} \times Z_L = Z_F^2 \quad (E7)$$

or $$Z_{in} = \frac{Z_F^2}{Z_L}$$

Each of the power transmitter 1A and the power receiver 1B of the wireless power transmission system 1 is designed to satisfy the resonance condition expressed by the equation (E1). Thus, the equations (E8) and (E9) below hold for the transmitter 1A and the receiver 1B, respectively.

$$2\pi f_0 L_S = \frac{1}{2\pi f_0 C_S} \quad (E8)$$

$$2\pi f_0 L_L = \frac{1}{2\pi f_0 C_L} \quad (E9)$$

From the equations (E8) and (E9), the equation (E10) below is obtained.

$$2\pi f_0 M = \frac{1}{2\pi f_0 C_S} - 2\pi f_0 (L_S - M) = \frac{1}{2\pi f_0 C_L} - 2\pi f_0 (L_L - M) \quad (E10)$$

Figure 7:
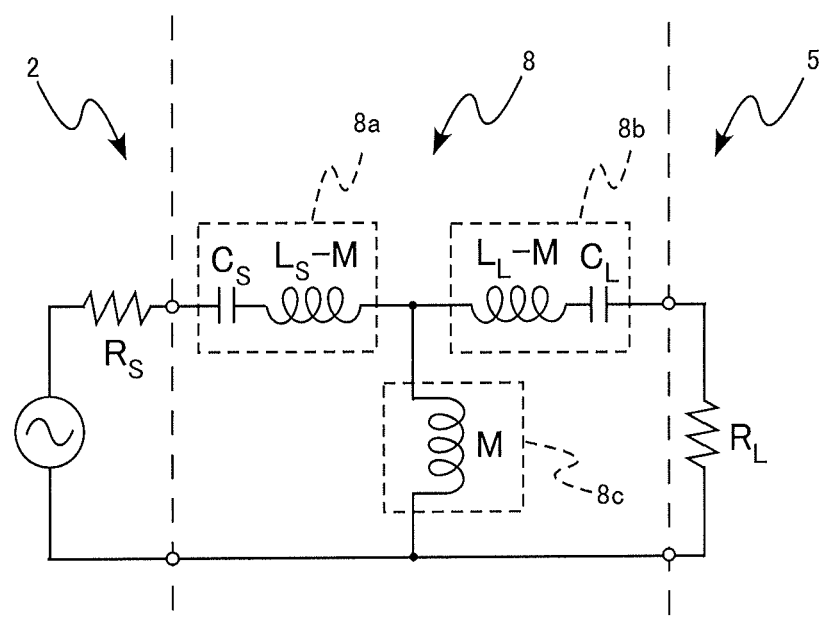
FIG. 7 illustrates an equivalent circuit of the wireless power transmission system according to the first embodiment of the present invention.

FIG. 7 shows the same equivalent circuit of the wireless power transmission system 1 as that shown in FIG. 4C. In this figure, the portion that functions as the transmission line 8 is shown to be distinguished from the high-frequency power supply 2 and the load 5.

In the equivalent circuit shown in FIG. 7, the impedance of the portion 8a surrounded by dashed lines is equal to $-j2\pi f_0 M$ at the resonance frequency $f_0$, as seen from the equation (E11) below.

$$\frac{1}{j 2\pi f_0 C_S} + j 2\pi f_0 (L_S - M) = \quad (E11)$$

$$j\left(2\pi f_0 L_S - \frac{1}{2\pi f_0 C_S}\right) - j 2\pi f_0 M = -j 2\pi f_0 M$$

Similarly, the impedance of the portion 8b surrounded by dashed lines is equal to $-j2\pi f_0 M$ at the resonance frequency $f_0$, as seen from the equation (E12) below.

$$\frac{1}{j 2\pi f_0 C_L} + j 2\pi f_0 (L_L - M) = \quad (E12)$$

$$j\left(2\pi f_0 L_L - \frac{1}{2\pi f_0 C_L}\right) - j 2\pi f_0 M = -j 2\pi f_0 M$$

The impedance of the portion 8c at the resonance frequency $f_0$, $j2\pi f_0 M$, is the conjugate of the impedance of the portion 8a (and 8b). Therefore, the transmission line 8, in which the parallel transmission line 3 and the coil 6 are magnetically coupled, has the same properties as a T-type high-pass filter whose characteristic impedance is $Z_0 = 2\pi f_0 M$ at the resonance frequency $f_0$.

The characteristic impedance $Z_0$ of the transmission line 8 can be determined by the mutual inductance M resulting from the magnetic coupling of the parallel transmission line 3 and the coil 6, regardless of the self-inductances $L_S$, $L_L$ of the parallel transmission line 3 and the coil 6, and the capacitances $C_S$, $C_L$ of the capacitors 4 and 7. Supposing that the coupling factor of the parallel transmission line 3 and the coil 6 is k, then the mutual inductance M can be expressed by the equation (E13) below, where the coupling factor k is determined by the geometric configurations (i.e., shapes) of the parallel transmission line 3 and the coil 6 and the mutual distance and orientation of the parallel transmission line 3 and the coil 6.

$$M = k\sqrt{L_S \times L_L} \tag{E13}$$

As understood from the foregoing, the changing of the mutual inductance M due to the variation in conditions of the antennas means that the characteristic impedance $Z_F$ of the T-type high-pass filter circuit shown in FIG. 5 will change, and this means that the characteristic impedance $Z_F$ of the ¼ wavelength line will change. Hence, in the illustrated embodiment, when the coupling conditions of the antennas change, the characteristic impedance $Z_F$ of the transmission line 8 will change.

Supposing that the output impedance of a given signal source is expressed as $Z_{in}$ and the input impedance of a given load is expressed as $Z_{out}$, the impedance matching that provides optimum transmission characteristics is achieved when the characteristic impedance $Z_F$ of the transmission line satisfies the equation (E14) below.

$$Z_F = \sqrt{Z_{in} \times Z_{out}} \tag{E14}$$

As noted above, the coupling factor k is determined by the geometric configurations of the parallel transmission line 3 and the coil 6, the distance between the line 3 and the coil 6, and the mutual orientation of the line 3 and the coil 6. Hereinafter, it is supposed that the coupling factor k is fixed, and an explanation is given regarding how the self-inductances $L_S$, $L_L$ of the transmission line 3 and the coil 6 for providing the optimum transmission characteristics can be calculated.

In the wireless power transmission system 1 shown in FIG. 1, the internal resistance Rs of the high-frequency power supply 2 corresponds to the output impedance $Z_{in}$ of the signal source, and the resistance $R_L$ of the load 5 corresponds to the input impedance $Z_{out}$ of the load. Thus, the transmission line 8 provides optimum transmission characteristics when the characteristic impedance $Z_0$ of the transmission line 8 satisfies the equation (E15) below.

$$Z_0 = \sqrt{R_S \times R_L} \tag{E15}$$

From the equations (E13) and (E15), the equation (E16) below is obtained. Thus, when the self-inductance $L_S$ of the parallel transmission line 3 and the self-inductance $L_L$ of the coil 6 are determined to satisfy the equation (E16), the desired impedance matching is achieved and optimum transmission characteristics are obtained.

$$\begin{aligned} Z_0 &= \sqrt{R_S \times R_L} \\ &= 2\pi f_0 M \\ &= 2\pi f_0 k \sqrt{L_S \times L_L} \\ L_S \times L_L &= \frac{R_S \times R_L}{(2\pi f_0 k)^2} \end{aligned} \tag{E16}$$

As noted above, each of the power transmitter 1A and the power receiver 1B of the wireless power transmission system 1 is designed to satisfy the resonance condition, i.e., the equations (E8) and (E9). Thus, when the self-inductances $L_S$, $L_L$ are determined, then the capacitances $C_S$, $C_L$ are to be determined based on the equations (E17), (E18) below:

$$C_S = \frac{1}{(2\pi f_0)^2 L_S} \tag{E17}$$

$$C_L = \frac{1}{(2\pi f_0)^2 L_L} \tag{E18}$$

In the present invention, the self-inductance $L_S$ of the parallel transmission line 3 and the self-inductance $L_L$ of the coil 6 are set to satisfy the equation (E16), while the capacitance $C_S$ of the capacitor 4 and the capacitance $C_L$ of the capacitor 7 are set to satisfy the equation (E17) and the equation (E18), respectively.

With the above arrangements, the wireless power transmission system 1 (with the coupling factor k kept constant) assures efficient power transmission from the high-frequency power supply 2 to the load 5.

Although the parallel transmission line 3 is used as the transmitting antenna in the first embodiment, the present invention is not limited to this embodiment. For instance, as shown in FIG. 8, the transmitting antenna may also be a coil like the receiving antenna.

Figure 8:
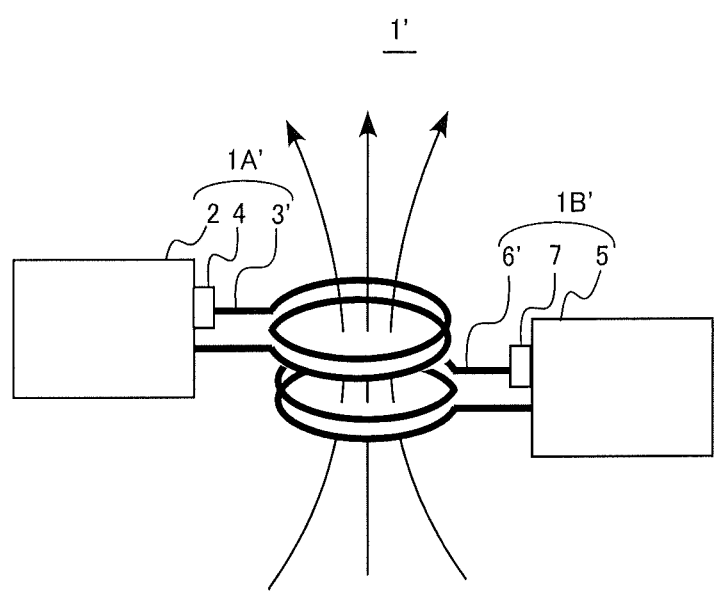
FIG. 8 is a schematic view illustrating a wireless power transmission system according to a second embodiment of the present invention.

Specifically, FIG. 8 illustrates the overall structure of a wireless power transmission system according to a second embodiment of the present invention. In this figure, the elements that are identical or similar to those of the wireless power transmission system 1 (FIG. 1) of the first embodiment are designated by the same reference signs as those used for the first embodiment.

The wireless power transmission system 1' of the second embodiment differs from the wireless power transmission system 1 of the first embodiment in that the transmitting antenna and the receiving antenna comprise similar or identical coils 3' and 6'. In this embodiment again, the self-inductance $L_S$ of the parallel transmission line 3, the self-inductance $L_L$ of the coil 6, the capacitance $C_S$ of the capacitor 4 and the capacitance $C_L$ of the capacitor 7 are set to satisfy the equations (E16)-(E18). Thus, the same advantages as those of the first embodiment are obtained.

When the self-inductance $L_S$ of the coil 3' and the self-inductance $L_L$ of the coil 6' are set to be equal to each other, the self-inductances $L_S$, $L_L$ can be determined based on the equation (E19) below.

$$L_S = L_L = \frac{\sqrt{R_S \times R_L}}{2\pi f_0 k} \tag{E19}$$

The wireless power transmission system and a method for designing the system (or the antennas) according to the present invention are not limited to the foregoing embodiments. The specific structure of each part of the wireless power transmission system and the method can be varied in many ways.

The invention claimed is:

1. A wireless power transmission system comprising:
   a transmitting antenna;
   a power supply for supplying electric power of a resonance frequency $f_0$ to the transmitting antenna;
   a first capacitor connected in series to the transmitting antenna;
   a receiving antenna magnetically coupled to the transmitting antenna;
   a load connected to the receiving antenna; and
   a second capacitor connected in series to the receiving antenna;
   wherein when a coupling factor between the transmitting antenna and the receiving antenna is represented by k, an internal resistance of the power supply is represented by Rs and a resistance of the load is represented by $R_L$, a self-inductance $L_S$ of the transmitting antenna and a self-inductance $L_L$ of the receiving antenna satisfy equation (1) below:

$$L_S \times L_L = \frac{R_S \times R_L}{(2\pi f_0 k)^2} \qquad (1)$$

and a capacitance $C_S$ of the first capacitor and a capacitance $C_L$ of the second capacitor satisfy equations (2), (3) below:

$$C_S = \frac{1}{(2\pi f_0)^2 L_S} \qquad (2)$$

$$C_L = \frac{1}{(2\pi f_0)^2 L_L}. \qquad (3)$$

2. The wireless power transmission system according to claim 1, wherein the self-inductance $L_S$ of the transmitting antenna and the self-inductance $L_L$ of the receiving antenna are equal to each other.

3. The wireless power transmission system according to claim 1, wherein the transmitting antenna comprises two electroconductive line elements parallel to each other.

4. The wireless power transmission system according to claim 2, wherein the transmitting antenna comprises two electroconductive line elements parallel to each other.

5. A method for designing a wireless power transmission system that includes a transmitting antenna, a power supply for supplying electric power of a resonance frequency $f_0$ to the transmitting antenna, a first capacitor connected in series to the transmitting antenna, a receiving antenna magnetically coupled to the transmitting antenna, a load connected to the receiving antenna, and a second capacitor connected in series to the receiving antenna, where a coupling factor between the transmitting antenna and the receiving antenna is represented by k, an internal resistance of the power supply is represented by $R_S$ and a resistance of the load is represented by $R_L$, the method comprising:

a first step of setting a self-inductance $L_S$ of the transmitting antenna and a self-inductance $L_L$ of the receiving antenna so as to satisfy equation (4) below:

$$L_S \times L_L = \frac{R_S \times R_L}{(2\pi f_0 k)^2}, \qquad (4)$$

and a second step of setting a capacitance $C_S$ of the first capacitor and a capacitance $C_L$ of the second capacitor so as to satisfy equations (5) and (6) below:

$$C_S = \frac{1}{(2\pi f_0)^2 L_S} \qquad (5)$$

$$C_L = \frac{1}{(2\pi f_0)^2 L_L}. \qquad (6)$$

\* \* \* \* \*